United States Patent [19]

Hünger et al.

[11] 4,302,389
[45] Nov. 24, 1981

[54] AZO COMPOUNDS DERIVING FROM AMINO BENZOIC ACID ANILIDES AND ACETOACETYLAMINO-BENZIMIDAZO-LONE

[75] Inventors: Klaüs Hünger; Manfred Pesenacker, both of Kelkheim, Fed. Rep. of Germany

[73] Assignee: Hoechst Aktiengesellschaft, Frankfurt am Main, Fed. Rep. of Germany

[21] Appl. No.: 86,126

[22] Filed: Oct. 18, 1979

[30] Foreign Application Priority Data

Oct. 21, 1978 [DE] Fed. Rep. of Germany ....... 2845947

[51] Int. Cl.³ ...................... C09B 29/01; C09B 29/32; D06P 1/44
[52] U.S. Cl. ..................................... 260/157; 106/23; 106/288 Q; 106/308 Q; 106/311; 260/208
[58] Field of Search ..................... 260/157; 106/288 Q

[56] References Cited

U.S. PATENT DOCUMENTS

| Re. 27,575 | 2/1973 | Ribka et al. | 260/157 |
|---|---|---|---|
| 3,109,842 | 11/1963 | Schilling et al. | 260/157 |
| 3,328,384 | 6/1967 | Dietz et al. | 260/157 |
| 3,956,266 | 5/1976 | Mory et al. | 260/157 |
| 4,080,321 | 3/1978 | Kunstmann et al. | 260/157 |
| 4,150,019 | 4/1979 | Frolich et al. | 260/157 |
| 4,169,830 | 10/1979 | Hunger | 260/157 |
| 4,195,020 | 3/1980 | Hunger et al. | 260/157 |

FOREIGN PATENT DOCUMENTS

| 1808017 | 6/1970 | Fed. Rep. of Germany | 260/157 |
|---|---|---|---|
| 2800765 | 7/1978 | Fed. Rep. of Germany | 260/157 |
| 1266615 | 3/1972 | United Kingdom | 260/157 |

Primary Examiner—Floyd D. Higel
Attorney, Agent, or Firm—Curtis, Morris & Safford

[57] ABSTRACT

When diazotizing a p-amino-benzoic acid anilide, the anilide nucleus of which is substituted in its para-position by carbamoyl, acetamino or chloro and coupling it onto 5-acetoacetylamino-benzimidazolone-(2) monoazo pigments are obtained having a high fastness to light, solvents, overlacquering and bleeding and a very high heat resistance.

1 Claim, No Drawings

AZO COMPOUNDS DERIVING FROM AMINO BENZOIC ACID ANILIDES AND ACETOACETYLAMINO-BENZIMIDAZOLONE

Subject of the present invention are azo compounds of the formula I

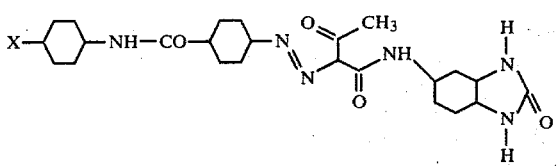

wherein X is carbamoyl, acetamino or chloro.

Subject of the present invention further is a process for the manufacture of the said azo compounds, which comprises diazotizing compounds of the formula II

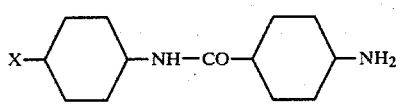

wherein X is as defined above and coupling the resulting diazonium compounds onto 5-acetoacetylamino-benzimidazolone-(2), for example in an aqueous medium.

Subject of the present invention finally is the use of the azo compounds according to the invention as coloring matter, in particular as pigments.

The amine of the formula II can be diazotized, for example using alkali metal nitrites or lower alkylnitrites with acids of sufficient strength, in particular a mineral acid, or with nitrosylsulfuric acid. During diazotization as well as during the subsequent coupling reaction, surfactants such as non-ionic, anionic or cationic dispersing agents, may be suitably added.

Diazotization and coupling can alternatively be carried out in the presence of appropriate organic solvents, for example glacial acetic acid, lower alkanols, dioxan, formamide, dimethylformamide, dimethyl sulfoxide, pyridine or N-methyl-pyrrolidone. To obtain the full tinctorial strength and a particularly favorable crystal structure it is often advisable to heat the coupling mixture for some time, for example at boiling temperature or at a temperature above 100° C. under pressure, optionally in the presence of organic solvents such as lower alkanols, for example ethanol, halogen-aromatic compounds such as chlorobenzene or dichlorobenzenes, for example o-dichloro-benzene, dimethylformamide or in the presence of a resin soap. Particularly pure pigments of high tinctorial strength are obtained using the products according to the invention when subjecting, after coupling, the moist filter cakes or the dried powders to a thermal aftertreatment with organic solvents, such as alcohols, in particular lower alkanols, pyridine, glacial acetic acid, dimethylformamide, N-methylpyrrolidone, dimethyl sulfoxide, halogen-aromatic compounds such as chlorobenzene or dichlorobenzenes, for example o-dichlorobenzene or nitrobenzene, or when grinding the pigments with the addition of grinding auxiliaries.

By the term "lower" in connection with alkyl radicals there are to be understood groups having of from 1 to 6, in particular of from 1 to 4, carbon atoms.

The pigments may alternatively be obtained in the presence of a carrier, for example baryte.

The novel compounds are insoluble in water and in the common organic solvents and are suitable for pigmenting printing inks, lacquers and dispersion paints, for coloring plastics, caoutchouc and natural or synthetic resins. Moreover they are especially appropriate for coloring plastics such as polyolefins, whose processing temperatures are in many cases above 250° C. The pigments according to the invention are further suitable for pigment printing onto substrates, in particular onto textile fiber materials or onto other flat structures such as paper.

The pigments according to the invention may further be used in other application fields, for example in finely divided form for coloring rayon made of viscose, or cellulose ethers or esters, polyamides, polyurethanes, polyglycol terephthalates or polyacrylonitriles, in the spinning mass, or for coloring paper.

The pigments can be well processed in the said media. The dyeings obtained therewith are distinguished by very good fastness to light and in particular by outstanding heat resistance, by resistance to chemicals, in particular to solvents, by good fastness to overvarnishing in lacquers and to bleeding in plastics.

The following examples illustrate the invention. Percentages are by weight.

EXAMPLE 1

38.5 g of 4-(4'-amino-benzoylamino)-benzamide are stirred in a mixture of 300 ml of water and 60 ml of 31% hydrochloric acid at 20° C. for 12 hours. The mixture is cooled with ice to 5° C., whereafter 20 ml of a 40% sodium nitrite solution are slowly introduced under its surface, and stirred at 5°-10° C. for 45 minutes. The excess nitrite is destroyed with amidosulfonic acid. Simultaneously, in a second receptacle, 36 g of 5-acetoacetylamino-benzimidazolone-(2) are suspended in 300 ml of water and subsequently dissolved therein by the addition of 30 ml of 33% sodium hydroxide solution.

The resulting solution is introduced in 30 minutes, while well stirring, at 15° to 20° C. under the surface of a mixture of 250 ml of water, 25 ml of glacial acetic acid, 300 ml of 4 N sodium acetate solution and 5 ml of a 10% solution of the reaction product of stearyl alcohol and 25 mols of ethylene oxide. The resulting suspension of the coupling component is stirred for 30 minutes.

The suspension of the diazo component is added to the suspension of the coupling component at 20° C. Upon completion of the addition, the mixture is stirred for 1 hour at room temperature, heated to 90° C., kept at this temperature for 1 hour, filtered in the hot state and washed salt-free with water.

The technological properties are improved when the crude pigment, which has been dried at 65° C. and subsequently ground, is stirred in dimethylformamide, heated to 80° C. and subsequently to 125° C. within 30 minutes, collected by suction-filtration, washed subsequently with methanol and water, dried and ground. This gives a reddish-yellow monoazo pigment having the structure

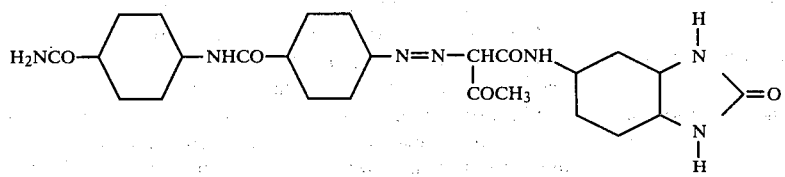

When incorporated into an alkyd resin-melamine resin clear varnish the pigment yields transparent dyeings having good fastness to over-varnishing and outstanding fastness to light. High-density polyethylene colored with the pigment is distinguished by a very high heat resistance.

EXAMPLE 2

25 g of 4-(4'-amino-benzoylamino)-chloroaniline are introduced into 250 ml of N-methylpyrrolidone and stirred for 20 minutes. 40 ml of 31% hydrochloric acid are added and the temperature is adjusted to 10° C. by exterior cooling. The mixture is stirred for 30 minutes. 20 ml of 5 N sodium nitrite solution which has been previously diluted to 150 ml with water are added dropwise at a temperature of at most 15° C. Thereto there is added a solution of 24 g of 5-acetoacetylamino-benzimidazolone-(2) in 250 ml of N-methylpyrrolidone.

The mixture is stirred for 40 minutes at a temperature of at most 15° C. Thereafter 300 ml of 2 N sodium acetate solution are added dropwise within 1 hour and stirring is continued for one additional hour. The mixture is heated with steam to 95° C. and kept at this temperature for 30 minutes, cooled to 50° C., filtered, washed with ethanol and water, dried at 65° C. and ground. This gives 42.0 g of a reddish-yellow monoazo pigment of the following structure:

addition of ice and diazotization is brought about by slowly introducing 14 ml of a 40% sodium nitrite solution under the surface of the mixture at 0° to 5° C. Stirring is continued for 30 minutes at 5° to 10° C. and subsequently the excess nitrite is destroyed with amidosulfonic acid.

Simultaneously, in a second receptacle, there are suspended 25 g of 5-acetoacetylamino-benzimidazolone-(2) in 300 ml of water and dissolved by addition of 20 ml of 33% sodium hydroxide solution. The resulting solution is added, while well stirring, at 15° to 18° C., to a phosphate buffer of pH 6 to 7 which contains 10 ml of a 10% solution of the reaction product of stearyl alcohol and 25 mols of ethylene oxide. The resulting suspension is stirred for 30 minutes.

Next, the suspension of the diazo component is added to the suspension of the coupling component, under the surface. The temperature is maintained at 20° to 23° C. with ice. Upon completion of the addition stirring is continued for 1 hour at room temperature, then the mixture is heated to 90° C., kept at this temperature for 1 hour, cooled with ice to 70° C., filtered and washed salt-free with water. The dried and ground crude pigment is homogenized for 30 minutes at room temperature in glacial acetic acid, stirred for 20 minutes at 80° to 85° C., collected by filtration and washed subsequently with ethanol and water. Drying at 70° C. gives a reddish-yellow pigment of the structure:

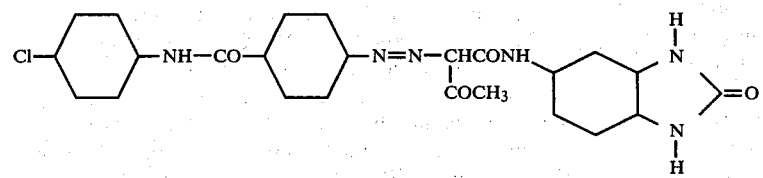

When incorporated into an alkyd resin-melamine resin clear varnish, this pigment yields transparent dyeings having good fastness to overvarnishing and very good fastness to light. High-density polyethylene colored with this pigment is distinguished by outstanding heat resistance.

EXAMPLE 3

27 g of 4-(4'-aminobenzoylamino)-1-acetylaminobenzene are stirred in a mixture of 50 ml of glacial acetic acid and 40 ml of 31% hydrochloric acid at room temperature for 1 hour. 400 ml of water are added to the mixture, the temperature is adjusted to 0° C. by the

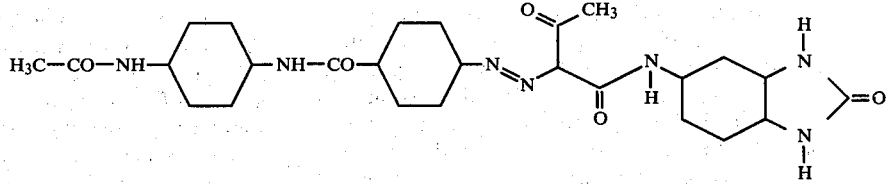

When incorporated into an alkyd resin-melamine resin clear varnish, this pigment yields transparent dyeings having good fastness to overvarnishing and good fastness to light. High-density polyethylene colored with this pigment is distinguished by very high heat resistance and good fastness to light.

What is claimed is:
1. A compound of the formula

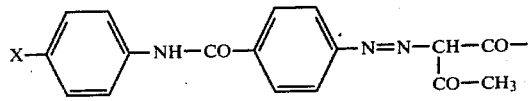
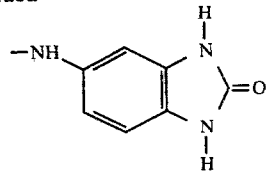
wherein X is carbamoyl or acetamino.
* * * * *